(12) United States Patent
Lutnick et al.

(10) Patent No.: US 8,463,690 B2
(45) Date of Patent: Jun. 11, 2013

(54) SYSTEMS AND METHODS FOR VENDING AND ACQUIRING ORDER PRIORITY

(75) Inventors: Howard W Lutnick, New York, NY (US); Michael Sweeting, Aldershot (GB)

(73) Assignee: BGC Partners, Inc., New York, NY (US)

( * ) Notice: Subject to any disclaimer, the term of this patent is extended or adjusted under 35 U.S.C. 154(b) by 2361 days.

(21) Appl. No.: 11/168,253

(22) Filed: Jun. 28, 2005

(65) Prior Publication Data
US 2006/0293996 A1 Dec. 28, 2006

(51) Int. Cl.
*G06Q 40/00* (2012.01)

(52) U.S. Cl.
USPC .............................. 705/37; 705/35; 705/36 R

(58) Field of Classification Search
USPC ...................................................... 705/35–37
See application file for complete search history.

(56) References Cited

U.S. PATENT DOCUMENTS

| | | | | |
|---|---|---|---|---|
| 5,787,402 | A * | 7/1998 | Potter et al. | 705/37 |
| 6,560,580 | B1 * | 5/2003 | Fraser et al. | 705/36 R |
| 7,246,093 | B1 * | 7/2007 | Katz | 705/37 |
| 7,343,341 | B2 * | 3/2008 | Sandor et al. | 705/37 |
| 7,398,244 | B1 * | 7/2008 | Keith | 705/37 |
| 7,472,087 | B2 * | 12/2008 | Keith | 705/37 |
| 7,496,533 | B1 * | 2/2009 | Keith | 705/37 |
| 7,644,027 | B2 * | 1/2010 | Keith | 705/37 |
| 7,685,052 | B2 * | 3/2010 | Waelbroeck et al. | 705/37 |
| 7,882,007 | B2 * | 2/2011 | Keith | 705/37 |
| 7,908,198 | B1 * | 3/2011 | Keith | 705/37 |
| 8,180,698 | B2 * | 5/2012 | Lerner | 705/37 |
| 2001/0042040 | A1 * | 11/2001 | Keith | 705/37 |
| 2002/0116314 | A1 | 8/2002 | Spencer et al. | |
| 2002/0120555 | A1 * | 8/2002 | Lerner | 705/37 |
| 2003/0126066 | A1 | 7/2003 | Nunes et al. | |
| 2004/0236669 | A1 | 11/2004 | Horst et al. | |
| 2004/0254804 | A1 * | 12/2004 | Peterffy et al. | 705/1 |
| 2005/0055304 | A1 | 3/2005 | Lutnick et al. | |
| 2005/0108125 | A1 * | 5/2005 | Goodwin et al. | 705/35 |
| 2005/0125327 | A1 | 6/2005 | Fishbain | |
| 2010/0250425 | A1 * | 9/2010 | Sweeting | 705/37 |
| 2012/0215678 | A1 * | 8/2012 | Lerner | 705/37 |

FOREIGN PATENT DOCUMENTS

| | | |
|---|---|---|
| JP | 2001-134641 | 5/2001 |
| JP | 2002-197281 | 7/2002 |
| JP | 2002-533816 | 10/2002 |
| JP | 2004-151764 | 5/2004 |
| WO | WO 00/38093 | 11/1999 |
| WO | WO 2004/010366 | 1/2004 |

OTHER PUBLICATIONS

Laird, Paul, "MarkAir Comes of Age," Alaska Business Monthly, Anchorage, Oct. 1986, vol. 2, Iss. 10, Sec. 1, p. 28.*

(Continued)

*Primary Examiner* — Narayanswamy Subramanian
(74) *Attorney, Agent, or Firm* — Thomas D. Bradshaw

(57) ABSTRACT

Systems and methods for vending and acquiring of trading priority in electronic trading systems are provided. The systems and method preferably provide for vending and acquiring priority in any suitable electronic trading system. Such suitable electronic trading systems include, but are not limited to, hit/lift exclusive priority systems, price time priority systems, order allocation systems, and request for quote systems.

19 Claims, 3 Drawing Sheets

OTHER PUBLICATIONS

International Search Report and Written Opinion for International Application No. PCT/US06/25410, dated May 29, 2008 (5 pages).
EP Supplementary search Report for EP Application No. 06785863.9; Dec. 21, 2009; 5 pages.
AU Examination Report for Application No. 2006263658; Mar. 30, 2009; 2 pages.
AU Examination Report for Application No. 2010257463; Jul. 13, 2011; 3 pages.
JP Office Action for Application No. JP2008-519574; 7 pages (includes English Translation); Aug. 30, 2011.
JP Office Action for Application No. JP2008-519574; 6 pages (includes English Translation); Dec. 24, 2012.

* cited by examiner

SYSTEMS AND METHODS FOR VENDING AND ACQUIRING ORDER PRIORITY

INTRODUCTION

The present invention relates to an electronic system for trading order priority in accordance with specific protocols.

BACKGROUND OF THE INVENTION

Electronic trading systems provide a forum for buyers and sellers to share price information about traded goods and thereby facilitate efficient marketplace transactions. Sellers and buyers alike may be permitted access to market information to make informed decisions about pricing and volume. Host computers may run a number of applications including order-matching, maintaining order books and positions, price information, and managing and updating databases while trading is being effected. Other data processing may be effected after close of trading, for example creating or maintaining an audit trail. Additionally, some trading interfaces (such as Application Program Interfaces) may allow other computers to act on behalf of users. Such computers may be programmed with statistical models for program trading. Trades may be transacted upon a matching of contra orders, i.e., orders on the opposite sides of a transaction.

One important component of electronic trading systems is order priority. Order priority is the mechanism by which systems determine which orders are matched first, second, etc. To facilitate orderly and market-efficient transactions, electronic trading systems may establish rules or combinations of rules to determine which buyers and which sellers can trade with each other at a given time.

Priority rules may be based on both price, time or other suitable criteria. Typically, buyers and sellers place bids and offers for a defined class of traded goods. Each trading participant may place a bid or offer at a select price and volume. Priority may be awarded to the best or highest bid price from a trading participant who wants to buy the traded good, as well as to the best or lowest offer price from a trading participant who wants to sell the traded good. If multiple competing orders are resident in the system at the same price, then priority may be awarded to the earliest in time order among the competing orders. As such, a queue (or "stack") of bids and offers develops in price and time order.

In some trading systems, once the queue forms, trading may begin only by an affirmative action on the part of a trading participant. This is sometimes knows as hit—i.e., an acceptance of a pending bid—and lift (or, "take")—i.e., an acceptance of a pending offer—trading. In hit and lift trading, the trading participant who takes affirmative action to enact a trade—i.e., he either hits a bid or lifts an offer—may be known as the "active" participant. The trading participant whose bid was hit or whose offer was lifted may be known as a "passive" participant. The first of such active and passive trading participants in line to trade may be referred to herein as "current" participants. The current participants may trade while the other participants remain queued up in the stack below waiting to trade.

During some types of hit and lift trading, initial priority may be awarded to the first trading participant that actively hit a bid or lifted an offer and to the first passive participant on the contra side of the trade. These trading participants may therefore transact trades further between each other and then subsequently with more contra counterparties before other participants on their same side who did not initially act affirmatively to trade or may not have participated passively on the contra side of the trade.

In some embodiments of hit and lift trading, once a trade has been transacted, the current participants may be allowed priority to trade additional volume a predetermined time period or some other suitable time period. A hit and lift system that includes the ability for current participants to transact additional volume once an initial trade has been transacted is described in detail in U.S. Pat. No. 6,560,580. The additional time period grants the current participants preferably time-limited exclusivity and allows the current participants at least one period of time to trade exclusively at that price.

After the current trading participants who have initial priority are finished, or, alternatively "done", trading, trading may continue down the stack in price and time order, or "priority". Price and time priority trading rewards priority to same price orders that are submitted earliest in time.

Typically, price/time priority trading participants may not move up the stack and into a current priority trading position. As long as the current trading participants are benefiting from their respective priority, the rest of the participants in the stack have to wait. If the current trading participants complete their transactions before their priority ends, valuable trading time may go to waste as price/time trading participants wait in line. Also, the current priority holders, when finished, may wish to make their remaining priority time available for other traders to use, in return for a financial compensation.

It would be desirable to provide a system that allows for participants that desire to trade during the otherwise-wasted time to have access to the time period of limited trading exclusivity.

It would, therefore, be desirable to provide a system and methods of electronic trading that support the acquiring and vending of trading priority.

Electronic exchanges and trading systems that provide such functionality may allow a trader to significantly improve his own or his firm's bottom line or profitability. These qualities, arising out of the technical way such priority situations are handled, may make such exchanges and interfaces desirable.

Furthermore, Exchanges and trading systems that allow quick and economic use of such functionality may allow a trader an advantageous ability to maximize opportunity in fast moving markets.

SUMMARY OF THE INVENTION

It is an object of this invention to provide a system that allows for participants that desire to trade during the otherwise wasted time to have access to the time period of limited trading exclusivity.

It is also an object of this invention to provide a system and methods of electronic trading that support the acquiring and vending of trading priority.

It is a still further aspect of this invention is to allow other trading participants to partake of the limited exclusivity that initial hit and lift trading participants may benefit from.

In one embodiment of the systems and methods of the invention, priority is awarded to trading participants for a particular period of time. Thus, the priority takes on the characteristics of an option to purchase or sell a certain item in a given time frame. An option, by nature, has value and can, therefore, be acquired or vended (sold) for value.

It is an object of this invention to provide systems and methods of electronic trading that support the acquiring and vending of trading priority.

One embodiment of the above-mentioned electronic trading system includes (1) a server with a storage device and one or more server processors that store a server program for controlling the storage device connected to the server storage device; (2) the one or more server processors operating with the server program to transact the vending and acquisition of priority between a plurality of trading participants, including a priority vendor and a priority acquirer; (3) a plurality of workstations that communicate with the server, having a storage device and a processor connected to the storage device, where the storage device stores a workstation program for controlling the workstation processor; (4) the workstation processor operating with the workstation program to (a) display transaction information relating to the traded priority to trading participants, (b) receive a bid or offer entered by a first trading participant at a select price or volume, (c) execute a transaction in accordance with a command entered by a second participant to trade the item at the select price, (d) enable the first and second trading participants to continue to trade volume at the select price, and (e) enable the first and second trading participants to vend priority; and (f) enable subsequent trading participants to acquire priority (5) a clearing center operating to communicate with the server, wherein the clearing center includes a storage device and at least one processor connected to the clearing storage device that stores a clearing program for controlling the clearing processor; and (6) the clearing processor operating with the clearing program to cause the transactions to be completed and cleared and to verify that the transactions are completed and cleared.

One embodiment of the above-mentioned method for electronic trading includes (1) storing a server program for controlling at least one server processor; (2) communicating with the server by a plurality of workstations, that include storing a workstation program for controlling at least one workstation processors; (3) displaying transaction information relating to the traded priority to trading participants; (4) receiving a bid or offer entered by a first trading participant at a select price or volume; (5) executing a transaction in accordance with a command entered by a second participant to trade the item at the select price; (6) enabling the first and second trading participants to continue to trade volume at the select price; (7) enabling the first and second trading participants to vend priority; (8) enabling subsequent participants to acquire priority and (89) communicating with the server by a clearing center that stores a clearing program for controlling a clearing processor for causing the transactions to be completed and cleared and to verify that the transactions are completed and cleared.

One embodiment of the above-mentioned electronic trading system includes a computer-readable medium with instructions for (1) storing a server program for controlling at least one server processor; (2) communicating with the server by a plurality of workstations, that include storing a workstation program for controlling a workstation processor; (3) displaying transaction information relating to the traded priority to trading participants; (4) receiving a bid or offer entered by a first trading participant at a select price or volume; (5) executing a transaction in accordance with a command entered by a second participant to trade the item at the select price; (6) enabling the first and second trading participants to continue to trade volume at the select price; (7) enabling the first and second trading participants to vend priority; (8) enabling subsequent participants to acquire priority and (9) communicating with the server by a clearing center that stores a clearing program for controlling a clearing processor for causing the transactions to be completed and cleared and to verify that the transactions are completed and cleared.

BRIEF DESCRIPTION OF THE DRAWINGS

Further features of the invention, its nature and various advantages will be apparent from the following detailed description of the preferred embodiments, taken in conjunction with the accompanying drawings, in which like reference characters refer to like parts throughout, and in which.

DETAILED DESCRIPTION OF THE INVENTION

Figure 1:
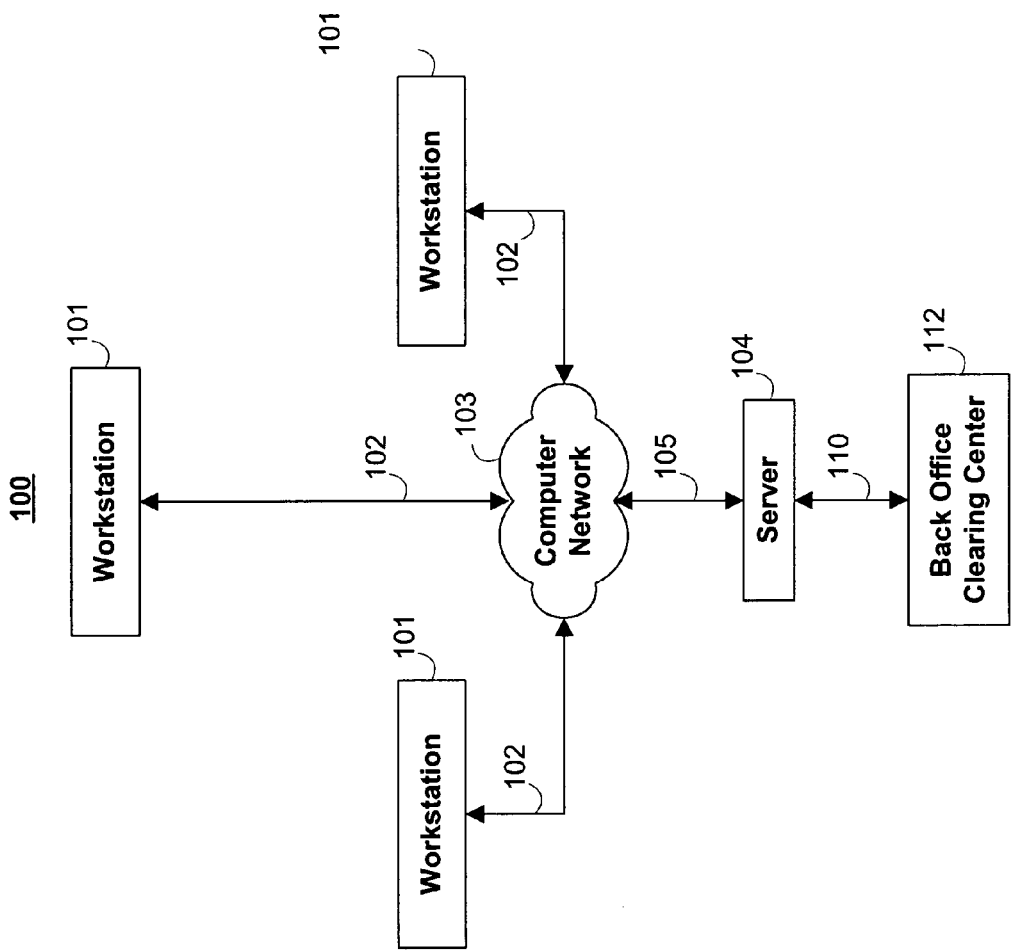
FIG. 1 is an illustration of an electronic implementation of a system in accordance with some embodiments of the present invention.

Trading priority has value to trading participants, both those who are enjoying a trading priority position, and those who wish to obtain priority outside of the standard priority rules to improve their respective position on the buy or sell list. On the other hand, trading priority may be of no value to other trading participants, for example, those who have enjoyed priority but who have finished trading, or those who connect their trading models via an automated program via an application programming interface (API) that may not recognize, or, alternatively, take advantage of, priority. These differing interests in priority create a marketplace for the sale and purchase of trading priority, wherein participants who do not use their trading priority can effectively sell ("vend") their unused priority to those who desire to purchase ("acquire") it, and receive value in return.

In one embodiment of the invention a trading participant who has completed trading may choose to vend his priority in order to receive a price reduction in brokerage fees or commissions. A trading participant may choose to acquire the unused priority to improve his respective position in the buy or sell stack and thus increase the chances of trading more volume sooner. The trading participant may pay value for such an improvement of position in the form of increased trading fees—e.g., brokerage fees, clearing fees or trading system fees.

One example of a user who has indicated his desire for priority, or alternatively, his desire to trade the item, is disclosed in U.S. patent application Ser. No. 10/678,582. Such a desire is identified therein as attributed to a user who has elected to pay slightly more to buy, or receive slightly less to sell (sometimes known as "price improvement" or "PI") in order to move ahead in the stack. Trading participants who elect to use price improvement may move ahead in the stack of those who have not, to improve the chances that they execute their trades. Trading participants who do not pay the extra brokerage may be known as "regular users."

The following definitions of trading participants are used throughout the description to more easily define the concepts of the invention. Nevertheless, the invention is not limited to these particular trading participants and may apply to any suitable trading participant.

a) Market Makers: Trading Participants that support a trading instrument by making regular bids and offers to support liquidity in that instrument.

b) Priority vendor: Trading participants that show an intent by some suitable action to vend priority. One embodiment of a priority vendor may be an API participant that trades on electronic trading systems. These API participants may not recognize and may not take advantage of priority rules and therefore may prefer to pay less brokerage on the volume already traded by vending their priority to another trading participant.

c) Priority acquirer: Trading participants that show an intent by some suitable action to acquire trading priority when made available by a priority vendor. Examples include but are not limited to trading participants that (1) use price improvement; (2) pay extra brokerage; and (3) are market makers.

Referring to FIG. 1, exemplary system 100 for implementing the present invention is shown. As illustrated, system 100 may include one or more workstations 101. Workstations 101 may be local or remote, and are connected by one or more communications links 102 to computer network 103 that is linked via communications links 105 to server 104. Server 104 is linked via communications link 110 to back office clearing center 112.

In system 100, server 104 may be any suitable server, processor, computer, or data processing device, or combination of the same. Server 104 and back office clearing center 112 may form part of the electronic trading system. Furthermore, server 104 may also contain an electronic trading system and application programming interface and merely transmit a Graphical User Interface or other display screens to the user at the user workstation, or the Graphical User Interface may reside on Workstation 101.

Computer network 103 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 102 and 105 may be any communications links suitable for communicating data between workstations 101 and server 104, such as network links, dial-up links, wireless links, hard-wired links, etc.

Workstations 101 may be personal computers, laptop computers, mainframe computers, dumb terminals, data displays, Internet browsers, Personal Digital Assistants (PDAs), two-way pagers, wireless terminals, portable telephones, programmed computers having memory, the programmed computer using the memory for implementing trading models, etc., or any combination of the same. Workstations 102 may be used to implement the electronic trading system application and application programming interface according to the invention.

Back office clearing center 112 may be any suitable equipment, such as a computer, a laptop computer, a mainframe computer, etc., or any combination of the same, for causing transactions to be cleared and/or verifying that transactions are cleared. Communications link 110 may be any communications links suitable for communicating data between server 104 and back office clearing center 112, such as network links, dial-up links, wireless links, hard-wired links, etc.

Figure 2:
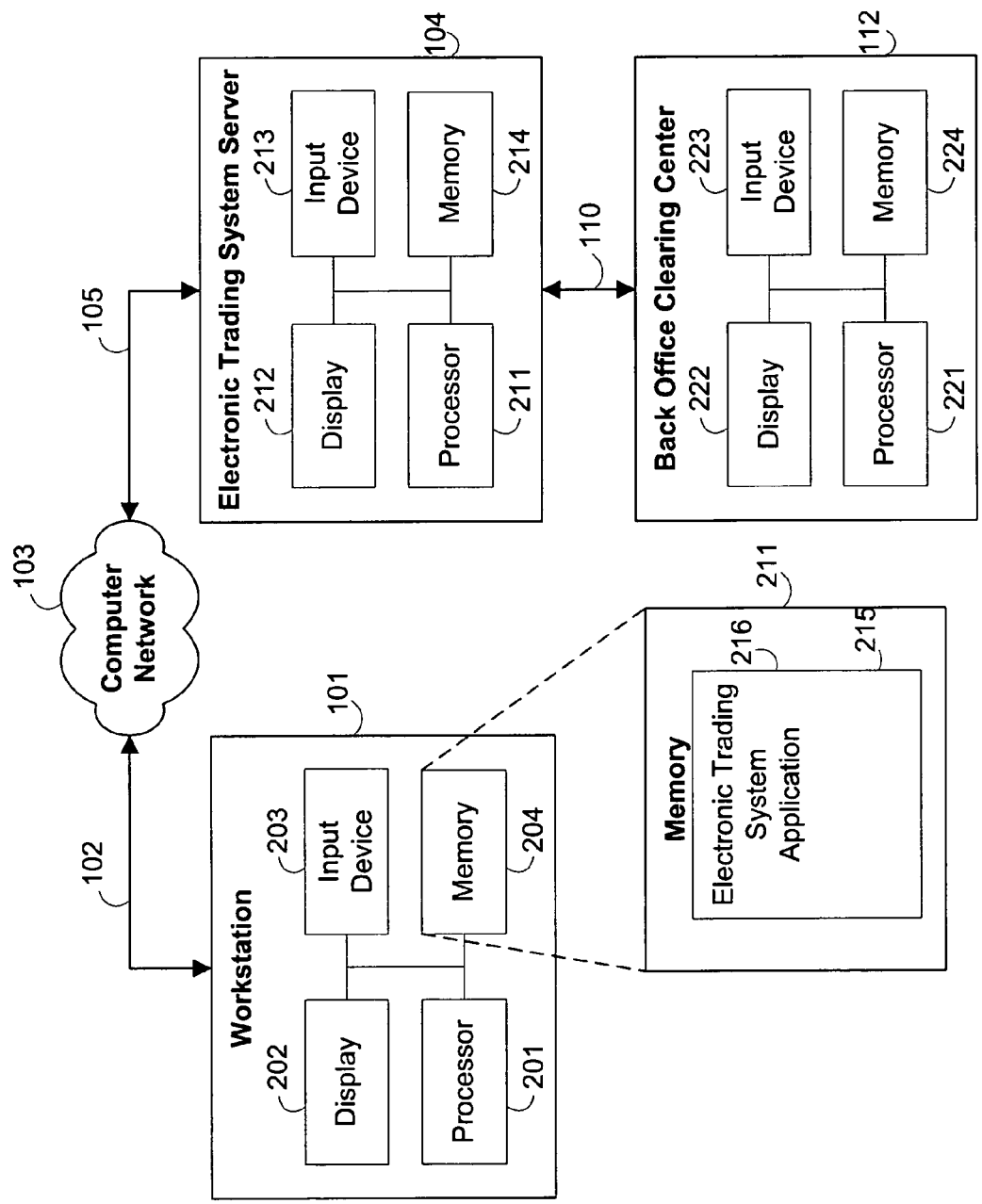
FIG. 2 is an illustration, in greater detail, of an electronic implementation of a system in accordance with some embodiments of the present invention.

The server, the back offices clearing center, and one of the workstations, which are depicted in FIG. 1, are illustrated in more detail in FIG. 2. Referring to FIG. 2, workstation 101 may include processor 201, display 202, input device 203, and memory 204, which may be interconnected. In a preferred embodiment, memory 204 contains a storage device for storing a workstation program for controlling processor 201. The storage device may include software stored on a suitable storage medium such as a disk. Memory 204 also preferably contains an electronic trading system application 216 according to the invention.

Electronic trading system application 216 may preferably include application program interface 215, or alternatively, as described above, electronic trading system application 216 may be resident in the memory of server 104. In this embodiment, the electronic trading system may contain application program interface 215 as a discrete application from the electronic trading system application which also may be included therein. The only distribution to the user may then be a Graphical User Interface which allows the user to interact with electronic trading system application 216 resident at server 104.

Processor 201 uses the workstation program to present on display 202 electronic trading system application information relating to market conditions received through communication link 102 and trading commands and values transmitted by a user of workstation 101. Furthermore, input device 203 may be used to manually enter commands and values in order for these commands and values to be communicated to the electronic trading system.

Priority Vending By Default

The following defines specific priority passage rules that may be implemented according to the invention.

In one embodiment of the invention, trading participants may set default trading parameters such that when they have priority, it will automatically vend to the next willing priority acquirer. When a priority vendor by default is first in the line of trading participants, the following trading priority rules may be implemented:

(i) For any first participant in a trade, the system may store a "priority vendor tally" for each of the participant's transactions.

The tally may be preferably participant specific and may record the amount traded by each participant. The system does not, however, change any active trading parameters—i.e., nothing different is done regarding vending priority until a period of active priority trading occurs.

(ii) If a trading participant hits a bid for the bid volume or for a higher volume than the existing bid, that active participant and passive, counter participant may become the current participants with trading rights. The system may update the priority vendor tally with respect to the current participants by the amount of the full initial trade executed by the current participants. The tally may also include subsequently traded volume where the priority traders become the priority participants during a then extended priority trading session with each other. In one embodiment of the invention, the tally may reset to zero when each participant loses their respective priority. In another embodiment, the tally may be stored and updated throughout the course of the trading day.

(iii) At inception of the trade, if a current participant is a priority vendor the participant may continue to enjoy priority in the traditional way, trading as much volume as he desires, and is available, on the contra side. According to the invention, the following three scenarios may occur: the priority vendor may (1) carry on as the current participant (when there is no priority acquirer on the same side of the trade), (2) vends the priority to the first priority acquirer who subsequently joins the trade on the same side as the priority vendor, or (3) becomes finished or "done" in the traditional fashion—i.e., either because he elects to end his trading session, or times out (the priority period ends according to the timing of the trading logic). In this embodiment, the current participant's priority vendor tally may reset to zero, as no successful vending of priority was transacted.

(iv) Where the conditions of trading priority exist and the priority vendor has no more size left to trade, a subsequent priority acquirer may take the place of the priority vendor as the current worker, and the priority vendor becomes "done" and is thus removed from the buy or sell stacks. The priority acquirer then becomes ready to trade additional volume and inherits whatever priority opportunities and time left over from the priority vendor.

(v) A priority acquirer that subsequently joins the trade on the same side as a priority vendor who still has more to trade may be allowed to become the current participant alongside but after any priority vendor size still unfilled. When there is subsequently no further volume to be traded from the priority vendor, the priority acquirer may become the sole current participant on that side of the trade, immediately trading any active contra current volume without being "done," and enjoying whatever priority opportunities and time is left to trade more. Any volume subsequently added to trade by the priority vendor, during the trade but after priority is transferred to the priority acquirer, may fall to the bottom of the buy or sell stack in price and time priority order, in accordance with the priority vendor having effectively passed priority to the priority acquirer.

(vi) The priority acquirer tally is preferably updated to include the full amount traded by the successful priority acquirer after priority acquisition for the duration of the trade as a result of acquiring priority, not including volume traded before that point.

(vii) If any contra current participant's priority ends while the priority acquirer is still the current participant on their side of a trade, the priority acquirer may immediately trade any other contra size that was waiting to trade, but previously held from trading according to the priority trading rules.

(viii) In one embodiment of the invention, after trading (or trade matching) ceases at a particular price level, the priority vendor receives an incentive in the form of a reduction in brokerage or trading fees on the size he has traded, as a result of the sale of his priority. Brokerage or trading fees for the priority vendor may be reduced by a dollars per million rate, applied to an amount that may be limited by the smaller of: 1) The priority vendor amount traded tally traded before priority vending (the volume the priority vendor traded before his trading priority was passed to the priority acquirer); 2) the priority acquirer amount tally traded after priority acquisition (the volume the priority acquirer subsequently traded due to acquiring trading priority); and 3) The actual monetary amount of brokerage or trading fee reduction the trading system may award to the priority vendor this may also be limited to that subsequently achieved from the priority acquirer.

For Example:
A Priority Vendor by default, "PV1" bids
  100.12 for 10 million ("million" is hereinafter designated by "m")
A Regular User, RU1 bids
  100.12 for 2 m
A Contra Trading participant, CT1, offers 100.12 for 14 m and thus hits both bids, selling to fulfill both buying interests with 2 m more remaining for sale. (PV1 retains trading priority albeit without yet showing additional size—PV1 has a priority time period to return and trade the extra 2 m available should he wish to).

The screen shows 100.12 HIT 12 0X2 (the zero designates the bid side of the stack, and the 2 designates the offer side of the stack in millions).

Another Regular User, "RU2" bids 100.12 for 5 m, and the screen shows 100.12 HIT 12 0X2
5
(the RU2 bid is held below the first position during the time the PV1 user has trading priority still, and this is denoted by the continued existence of the 0 m in front of (above) the 5 m.)

If a Priority Acquirer user "PA3" then bids 100.12 for 6 m then as a result, PV1 vends priority to PA3. The priority vendor tally for PV1 becomes 10 m.

Due to Priority Acquisition, PA3 immediately advances in position in front of the RU2 bid for 5 m and buys the 2 m for sale. PA3's priority acquirer tally accrues to 2 m.

CT1 now has the trading priority opportunity to sell additional volume to meet PA3's remaining unfilled bid (4 m still outstanding).

The screen shows 100.12 HIT 14 4X0

If CT1 sells just another 1 m, then CT1 would be immediately finished/"done" because they chose to not sell the full size of the remaining 4 m buy order such that CT1's trading priority ends and the screen then shows that 15 m have traded and 8 m more are bid for:
100.12 HIT 15 3X
5
(15 m have traded, PA3 has 3 m more to buy in the priority trading position, and RU2 has 5 m to buy underneath—there are no further sellers or trading priority on the seller's side of the trade).

If another contra participant sells another 1 m, the stack looks like:
100.12 HIT 16 2X
5
(16 m have traded, PA3 has 2 m more to buy in the priority trading position, and RU2 has 5 m to buy underneath—there are no further sellers or trading priority on the sellers side of the trade). PA3's priority acquirer tally accrues to 4 m.

At this point in the example, PV1 had a priority vendor tally of 10 the end of his trade. As a result of vending his priority, PA3 was able to trade 4 m in additional volume that he would not have done without acquiring priority. Thus, PV1 has received a discount towards the brokerage or trading fees that he paid on 4 m and no discount for the brokerage on 6*m* (this is because the discount is limited as well by the priority acquirer tally, which is only 4 m). PA3, on the other hand, may pay extra brokerage or trading fees for his entire volume. Alternatively, PA3 may pay slightly more in price for his volume traded, in the form of price improvement as disclosed in U.S. patent application Ser. No. 10/678,582.

Other types of electronic trading systems may include an automated system for matching market maker, professional trader and public customer orders and quotations with incoming orders and quotations on an exchange for securities. A market maker may be a professional user of an exchange with certain duties to maintain a bid and an offer in a security, either during certain periods or when required to do so ad hoc by trading system prompts.

A professional trader may be a trader with the same professional status of a market maker, but without any responsibilities towards maintaining liquidity on the exchange.

A public customer may be a non-professional or semi-professional investor user of the trading system, or indeed anyone other than a market maker or a professional trader. A new incoming order may be executed first against public customer orders and then filled against market maker and professional trader orders and quotations. The distribution of the incoming order with respect to the market maker and professional trader orders and quotations may be on a pro rata basis based on the size of the market maker and professional trader orders or quotations. An automated system for matching previously entered orders and quotations with incoming orders and quotations on an exchange for securities is described in detail in U.S. Pat. No. 6,618,707, which is incorporated herein by reference in its entirety.

In some embodiments of this system, a specialist (who may be responsible for maintaining an orderly market and providing liquidity and who accept orders, establish prices for a particular series of options and allocate trades among market professionals) may receive a relatively higher portion of the pro rata order volume (in return for accepting the aforementioned responsibilities, specialists oftentimes are assured minimum participation rights in the trading activity that occurs in the pit). For example, the "sell" or "offer" side of the trading book may be characterized in part by a public customer offer of 10 contracts from a public customer at a price of 3½, a primary market maker (i.e., specialist) offer for 20 contracts at 3½, and a professional trader offer for 5 contracts at 3½. Thereafter, an order to buy 30 contracts at 3½ may be sent to a bid matching process. The bid matching process may match 10 contracts with the public customer order to sell 10 contracts at 3½ because public customer orders may be matched first. Then the bid matching process may determine that there are 20 contracts of the incoming order remaining.

In order to match the remaining portion of the buy order with the remaining offers, a predetermined number may be established called the primary market maker ("PMM") small order preference size. If the size of the original order is less than the PMM small order preference size, then a PMM may trade for the remaining portion of the buy order. In some embodiments, after the public customer orders are matched, the bid matching process may then determine that the original size of the incoming order was greater than the PMM small order preference size, thereby allowing the remaining 20 contracts to be traded according to an allocation algorithm.

According to this example, a determination may be made that there is one professional trader along with the PMM at the best offer price. The remaining incoming order of 20 contracts may be allocated such that the PMM receives the greater of either 60% of the incoming order (12 contracts in this example), or the percentage of the PMM's order with respect to the entire outstanding order with which the incoming order matches. According to this example, the PMM's may be entitled to trade 16 of the remaining contracts because the PMM has 80% (20 of the 25) of the offered contracts at the best price.

The PMM therefore, in some embodiments of this electronic trading system, may have priority with respect to a certain portion of incoming orders over and above other trading participants. This priority may be vended to a priority acquirer in accordance with the present invention. The PMM may accept a lesser proportion of execution for their orders by vending priority to a professional trader priority acquirer, also with a subsequent re-adjustment of brokerage or trading fees.

In another type of trading system, trading priority may take the form of simply price and time priority. The sequence in which orders are matched first according to best price, and, when two orders have the same price, according to the earliest timestamp an order is given as it is received by the trading system. Orders at the same price may be matched "oldest first," but although sponsoring traders who are supporting the trading system may add orders to help liquidity, they may actually be less interested to trade. Such sponsoring traders (and the trading system provider) may prefer to allow other traders to trade before the sponsoring traders (or "market makers" as they may often be called), irrespective of order timestamps. Sponsoring traders may have a particular trading account that is set up to vend time priority to other traders at the same price and on the same side (buy or bid; sell or offer) to aid trading on the system. Monetary adjustment in the form of (but not limited to) brokerage or trading fee adjustments may be applied as disclosed herein, whereby the sponsoring trader may receive trading fee or brokerage reductions on subsequent trades for giving up trade opportunities to other traders.

In yet another type of trading system, orders at the best price may be matched according to a pro rata-sharing algorithm. In these trading systems, sponsoring traders who are supporting the trading system by adding orders to help liquidity may be also less interested to trade, and they (and the trading system provider) may prefer to vend priority in a pro rata-sharing algorithm to other more interested traders at the same price and on the same side (buy or bid side; sell or offer side). The invention as disclosed may also be applied to these trading algorithms to redistribute volume available to trade to those traders who need or desire it most. Monetary adjustment in the form of (but not limited to) brokerage or trading fee adjustments may also be applied.

Still other types of electronic trading systems may include what is commonly referred to as an RFQ (request for quote) trading system. In one embodiment of an RFQ system, an order entry dialog box ("OEDB") may provide the requesting trader with various options and entry fields. Using some of these options and entry fields, a trader may submit non-RFQ trade commands (i.e., standard trading commands), such as, a bid command, an offer command, a buy command, or a sell command for any suitable instrument. When the OEDB is activated, the fields in the OEDB may preferably be populated with information pertaining to the instrument for which the RFQ is made (the instrument may be selected in any suitable method). For example, the current market price for the instrument may populate the price and/or size field automatically, to allow a user to quickly arrive at their required price and size variables.

The OEDB may provide an RFQ preferences field. RFQ preferences field may be made available when the requesting trader selects an RFQ option from the OEDB. The field may provide a trader with an RFQ buy option, an RFQ sell option, an RFQ 2-way option, and an RFQ BOLS (Bid/Offer liquidity spread) option, as described below. The RFQ buy option and the RFQ sell option may provide the requesting trader with the ability to submit an RFQ from a buyer position (they are looking to buy a certain size of the instrument and are requesting contra offer quotes to be shown) and an RFQ from a seller position (they are looking to sell a certain size of the instruments and are requesting contra bid quotes to be shown), respectively. One option may provide the requesting trader with an opportunity to submit an RFQ without establishing a direction of trade (a "2-way" request for quote whereby responders are invited to quote both a bid and an offer). This may allow the requesting trader to receive a bid price and an offer price from a market participant. One option may provide the requesting trader with the ability to specify a bid/offer liquidity spread, whereby the requestor is asking for a 2-way quote of a certain maximum bid/offer spread.

A minimum size field, a time limit field, a BOLS field, and a minimum number of prices field are fields that may be incorporated in an RFQ preferences field. The requesting trader may specify a minimum size for an instrument he or she is willing to buy or sell. By populating a field, the requesting trader may specify a time limit as to how long his or her RFQ is open for receiving a quote from a market participant. If the requesting trader desires to specify a bid/offer liquidity spread (BOLS), the requesting trader can specify the BOLS value (the maximum bid/offer price spread that responders should use if quoting) and select an option. When another field is populated, the requesting trader may have an opportunity to specify the minimum number of quotes to receive from a market participant in response to his or her request.

The OEDB may also provide a trade preference field. This trade preference field may be used to indicate the trader's preferred trade type and may allow the requesting trader to select any type of trade that a particular exchange or trading system supports.

The requesting trader may exercise a guarantee-to-trade (GTT) option in a 2-way RFQ market in which a price parameter and a BOLS parameter is provided. This is a trade type that may not currently exist in the marketplace. GTT may be, for example, an option provided in the trade preferences field. The GTT status of the 2-way RFQ may be identified to the market participant in order to allow the market participant to be aware that the requestor promises that a trade will definitely be executed if he the responder meets the parameters set forth by the requesting trader.

The OEDB may also provide an auto-execution feature for an RFQ. The auto-execution feature, when selected, may be used to automatically respond to a market participant's quote. For example, if a quote satisfying the requesting trader's criteria for accepting the quote is received, an accept confirmation may be automatically transmitted from the requesting trader and the trade may be executed. Other various features for managing quotes received in response to an RFQ may be incorporated into the OEDB.

Selection Options and fields provided in the OEDB may be reconfigured to suit any requesting trader's needs and preferences, and reduce the time taken for users to quickly avail themselves of the trading system functionality in fast moving markets. The configure keypad option may provide the requesting trader with the ability to reconfigure the OEDB. The close-on-action box, when selected, may cause the OEDB to be automatically closed after specified actions are performed. The close option allows the requesting trader to close the OEDB on demand. In addition, an assignable issue buttons field may be provided to allow the requesting trader to have a specific set of instructions executed by the push of a single button. Issue buttons may be configured accordingly via the assign buttons option.

In some embodiments of an electronic trading system using RFQ style trading as outlined above, some responders may have priority with respect to a certain portion of incoming request for quote orders over and above the other responding trading participants. These responders may have responded earlier to a request for quote and be in line for matching first: both during an RFQ time period where the requestor may be awaiting more responding quotes, and at the end of an RFQ period where all quotes may be assembled and a requestor may trade (either by choice, or mandatory in the case of a "GTT" guaranteed to trade request). As many responders automatically respond to such request for quotes using computer models and programs, they may be relatively uninterested in trading with the requestor. Often in request for quote trading, a successful responder suffers a "winner's curse" whereby the successful response trade is actually more often a losing one monetarily. Where a responder is in line to trade first alongside other responders at the same price, they may be relatively uninterested to actually trade and prefer to vend such time priority to a priority acquirer in accordance with the present invention. The "VEND" key In many embodiments of the invention, participants not set up to vend their priority as a default may also be allowed to take advantage of priority vending on a per order basis. Where a user inputs a bid or offer, or buy or sell, the user may be allowed to use a "VEND" key, which may be implemented by or on any suitable input device such as a region on a display screen which can be activated by a moving an indicator on the screen and pressing a button on a mouse to activate the screen, or any type of keypad, mouse, trackball, Blackberry™ or any other suitable input device commonly found on devices that allow the participant to input information to or select information displayed on device to indicate the intention to vend priority. The vend key allows the priority vendor to send the trading system an instruction to vend priority The "VEND" key may be used in a hit and lift system as described above by a passive or active current participant to become a priority vendor for that trade either (1) initially before the conditions for a trading priority exist, or (2) subsequently, after the conditions for a trading priority exist and the user has finished trading and would like to see if he could vend remaining trading priority.

Once priority is vended using the "VEND" key, the priority rules described above preferably continue in the same manner as if priority was vended by default.

In other trading systems, the "VEND" key may be used in the same style. A user may decide to vend priority on an ad-hoc basis even if not set up to do so by default.

The presence of the "VEND" functionality in a trading system allows trading algorithms to execute matching algorithms faster when it is used, and especially where monetary gain gives users an incentive to use it. At some points of many trading algorithms, trading is momentarily held up to await an expiry of a period of time allocated to allow a user to make a trading decision. Trading users can pre-determine their decision by pressing "VEND" to allow priority vending at order inception, or during the period of time by pressing "VEND" to allow immediate vending of priority thenceforth in that trade, where trading priority is either current to that user, or may become so during the progression of the trade matching algorithm. This allows for a trading algorithm to process technically faster, and increases the velocity of trading to allow more volume to be processed by the trading system.

Figure 3:
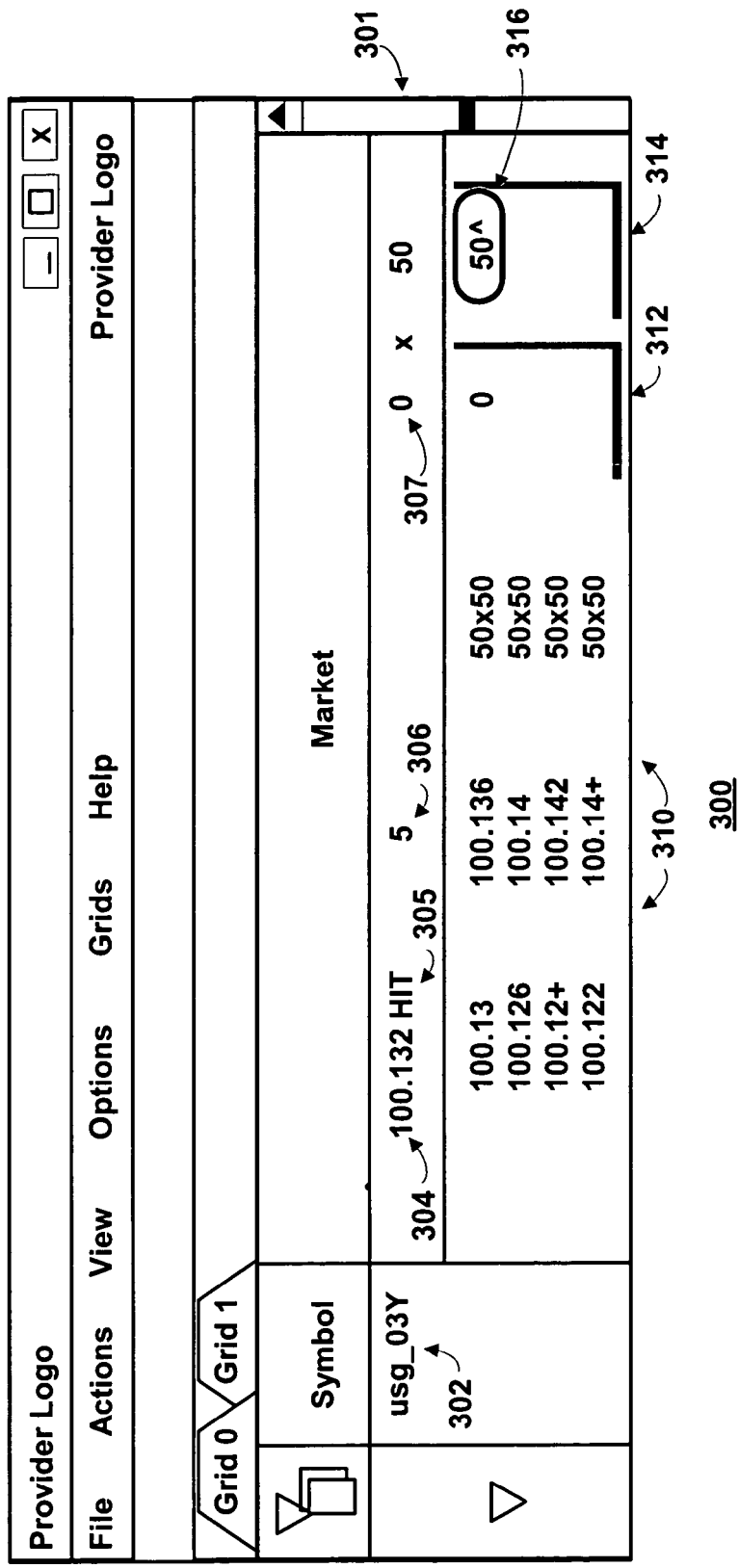
FIG. 3 is an illustration of an electronic trading interface in accordance with some embodiments of the present invention.

FIG. 3 shows an electronic trading interface 300 in accordance with some embodiments of the present invention. Interface 300 enables participants to enter into the system bids and offers at select prices and volumes, to be shown for the item being traded. The interface includes a top line 301 (alternatively referred to herein as the touch line, or the headline.) Top line 301 shows the status of the actual aggressed trade. Top line 301 may, alternatively, be adapted to include the price that should be initially aggressed to start a trade. In either case, top line 301 is typically located at top of the display area related to trading of a particular instrument. The display area may be hereinafter referred to as the "display". Top line 301 may include item 302, price 304, last trading action 305, size traded 306, and size on bid and offer for the current participants 307. Interface 300 also includes market depth information 310, which shows price and size for orders for the items that have not yet been traded consisting of bids numerically below and offers numerically above the best headline or touch line price (These bids numerically above, and offers numerically below are commonly known as the order book, or just the "book"). In systems traded as yield, the bids would be numerically higher and the offers numerically lower than the best headline or touch line price. Also shown in interface 300 are bid and offer stacks 312 and 314, respectively. Bid and offer stacks 312 and 314 may indicate the size one or many market participants are bidding or offering at the current headline price 304. Note that price 304 (shown as 100.132) in this exemplary example is shown in a traditional United States Government Bond pricing format.

In many embodiments of the invention, when priority becomes available during a trade, the system may flash a highlight (see circle 316, which indicates a highlight as seen on one embodiment) over which side of the market (bid, buy or offer, sell) the available priority pertains to. The flashing may only be shown where priority becomes available for use, and may be either shown over the trade side (buy or sell) for which the priority may be acquired for, or alternatively over the contra trade size over which priority may be acquired. The highlight may disappear when priority is acquired, or when priority is no longer available.

If the first priority acquirer subsequently presses VEND after acquiring priority, any remaining priority may then pass to the next potential priority acquirer in line, if there is one. Thus the first priority acquirer may then become a priority vendor as well. In such circumstances, the following rules may apply:

The initial priority acquirer tally (as detailed above) may then be used as a second priority vendor tally pertaining to this priority acquiring customer who may subsequently vend remaining priority.

Where priority is passed to a second priority acquirer in this manner, a second priority acquirer tally may be recorded pertaining to this second priority acquirer.

Although the initial priority acquirer tally may dictate how much extra brokerage fees are available to pay the initial priority vendor, any subsequent second (or third, fourth, etc.) priority acquirer tally may also be used cumulatively as available monies for the initial priority vendor.

In one embodiment of the invention, when the initial priority vendor obligations as to brokerage or trading fee reductions are satisfied, further available priority acquirer monies may be made available to reduce the brokerage cost of subsequent priority vendors, i.e., those participants who were originally priority acquirers before pressing "VEND." This means that priority acquirers who press VEND (1) become eligible for a priority vendor's rebate on subsequent volume traded, (2) limited by the volume they executed, (3) and limited to the excess over and above the volume maximum priority vendor rebate to which the original vendor was entitled. Other suitable arrangements are also possible.

Thus, systems and method for vending and acquiring priority in electronic trading systems have been provided. It will be understood that the foregoing is only illustrative of the principles of the invention, and that various modifications can be made by those skilled in the art without departing from the scope and spirit of the invention.

What is claimed is:

1. A system for trading an item comprising:
    a server comprising:
        a server storage device;
        a server processor connected to the server storage device, the server storage device storing a server program for controlling the server processor; and
    the server program, when executed by the processor, directs the server processor to:
        match trades between a plurality of trading participants in accordance with a trading algorithm; and
        transact the vending and acquiring of trading priority between at least one priority vendor and at least one priority acquirer, wherein the vending and acquiring of said trading priority includes an incentive awarded to the vendor.

2. The system for trading an item according to claim 1 wherein the trading algorithm is a hit/lift trading algorithm.

3. The system for trading an item according to claim 1 wherein the trading algorithm is for matching market maker, professional trader and public customer orders and quotations with incoming orders and quotations.

4. The system for trading an item according to claim 1 wherein the trading algorithm is a price and time priority trading algorithm.

5. The system for trading an item according to claim 1 wherein the trading algorithm is a pro-rata sharing trading algorithm.

6. The system for trading an item according to claim 1 wherein the trading algorithm is a request for quote trading algorithm.

7. The system for trading an item according to claim 1 wherein the server program, when executed by the processor, further directs the server processor to output an indication of a trading priority available for acquisition.

8. The system for trading an item according to claim 7 including a plurality of workstations, each of the plurality of workstations operative to communicate with the server, each of the workstations comprising:
    a workstation storage device;
    a workstation processor connected to the workstation storage device, the workstation storage device storing a workstation program for controlling the workstation processor; and
    the workstation program, when executed by the workstation processor, directs the workstation processor to:
        display transaction information to trading participants;
        receive an indication of a trading priority available for acquisition; and
        display an indication of a trading priority available for acquisition to the plurality of trading participants.

9. The system for trading an item according to claim 8 wherein the transaction information relating to the trading priority is displayed as an indication pertaining to a price and size available for trading.

10. The system for trading an item according to claim 8 wherein the transaction information relating to the trading priority is displayed as an indication pertaining to one of a bid, buy, offer or sell side for which priority may be acquired.

11. The system for trading an item according to claim 1 wherein the incentive awarded to the vendor is provided as a reduction in brokerage.

12. The system for trading an item according to claim 1 wherein the incentive awarded to the vendor is provided as a reduction in trading fees.

13. The system for trading an item according to claim 1 wherein the incentive awarded to the vendor is provided as a reduction in clearing fees.

14. The system for trading an item according to claim 1 wherein the incentive awarded to the vendor is sourced from a priority acquirer.

15. The system for trading an item according to claim 14 wherein the incentive sourced from a priority acquirer is provided as an increase in brokerage.

16. The system for trading an item according to claim 14 wherein the incentive sourced from a priority acquirer is provided as an increase in trading fees.

17. The system for trading an item according to claim 14 wherein the incentive sourced from a priority acquirer is provided as an increase in clearing fees.

18. The system for trading an item according to claim 1 wherein the vending of trading priority by the at least one priority vendor is by default.

19. The system for trading an item according to claim 1 wherein the vending of trading priority by the at least one priority vendor is implemented by said priority vendor sending an instruction to vend priority.

* * * * *